(12) United States Patent
Bai et al.

(10) Patent No.: US 9,628,154 B2
(45) Date of Patent: Apr. 18, 2017

(54) APPARATUS FOR AND METHOD OF CHANNEL QUALITY PREDICTION THROUGH COMPUTATION OF MULTI-LAYER CHANNEL QUALITY METRIC

(71) Applicant: Samsung Electronics Co., Ltd., Gyeonggi-do (KR)

(72) Inventors: Dongwoon Bai, San Diego, CA (US); Jungwon Lee, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/040,437

(22) Filed: Feb. 10, 2016

(65) Prior Publication Data

US 2016/0261316 A1 Sep. 8, 2016

Related U.S. Application Data

(60) Provisional application No. 62/127,674, filed on Mar. 3, 2015, provisional application No. 62/274,547, filed on Jan. 4, 2016.

(51) Int. Cl.
*H04L 1/02* (2006.01)
*H04B 7/0413* (2017.01)
(Continued)

(52) U.S. Cl.
CPC ......... *H04B 7/0413* (2013.01); *H04B 17/309* (2015.01); *H04L 1/203* (2013.01)

(58) Field of Classification Search
CPC ..... H04W 24/00; H04L 1/0026; H04B 17/327
(Continued)

(56) References Cited

U.S. PATENT DOCUMENTS

2004/0116142 A1 6/2004 Wang et al.
2005/0003782 A1 1/2005 Wintzell
(Continued)

FOREIGN PATENT DOCUMENTS

CN 103780362 5/2014
WO WO 2012149781 11/2012

OTHER PUBLICATIONS

Toyserkani, Arash T. et al, An Analytical Approximation to the Block Error Rate in Nakagami-m Non-Selective Block Fading Channels May 13, 2010, pp. 1543-1546, IEEE Transactions on Wireless Communications, vol. 9, No. 5.
(Continued)

*Primary Examiner* — Khai Tran
(74) *Attorney, Agent, or Firm* — The Farrell Law Firm, P.C.

(57) ABSTRACT

An apparatus and method for a transceiver are provided. The apparatus for the transceiver includes a multiple input multiple output (MIMO) antenna; a transceiver connected to the MIMO antenna; and a processor configured to measure channel gain $H_k$, based on the received signal, where k is a sample index from 1 to K, $H_k$ is an m×n matrix of complex channel gain known to the transceiver, measure noise variance $\sigma^2$ of a channel, calculate a per-sample channel quality metric $q(H_k, \sigma^2)$ using at least one bound of mutual information; reduce a dimension of a channel quality metric vector $(q(H_1, \sigma^2), \ldots, q(H_K, \sigma^2))$ by applying a dimension reduction function g(.); and estimate a block error rate (BLER) as a function of a dimension reduced channel quality metric $g(q(H_1, \sigma^2), \ldots, q(H_K, \sigma^2))$.

20 Claims, 4 Drawing Sheets

(51) Int. Cl.
*H04B 17/309* (2015.01)
*H04L 1/20* (2006.01)

(58) Field of Classification Search
USPC ........ 375/267, 219, 260, 357, 360; 379/252, 379/332
See application file for complete search history.

(56) References Cited

U.S. PATENT DOCUMENTS

| | | |
|---|---|---|
| 2005/0073989 A1 | 4/2005 | Wang et al. |
| 2009/0287970 A1 | 11/2009 | Iizuka et al. |
| 2010/0042876 A1 | 2/2010 | Yue et al. |
| 2011/0261868 A1* | 10/2011 | Bachl ............... H04L 1/206 375/224 |
| 2012/0113961 A1* | 5/2012 | Krishnamurthy ..... H04L 1/0026 370/332 |
| 2014/0098697 A1 | 4/2014 | Wang et al. |
| 2014/0101498 A1 | 4/2014 | Xiong et al. |
| 2014/0321521 A1 | 10/2014 | Lee et al. |
| 2014/0369215 A1 | 12/2014 | Yeo et al. |
| 2015/0117196 A1 | 4/2015 | Wang et al. |

OTHER PUBLICATIONS

Janani, Mohammad et al., Single-Block Coded Modulation for MIMO Systems, Feb. 18, 2009, pp. 327-333, IEEE Transactions on Communications, vol. 57, No. 2, Feb. 2009.
Baccarelli, Enzo, Evaluation of the Reliable Data Rates Supporeted by Mutliple-Antenna Coded Wireless Links for QAM transmissions, Feb. 2001, pp. 295-304, IEEE Journal on Selected Areas in Communications, vol. 19, No. 2, Feb. 2001.

\* cited by examiner

APPARATUS FOR AND METHOD OF CHANNEL QUALITY PREDICTION THROUGH COMPUTATION OF MULTI-LAYER CHANNEL QUALITY METRIC

PRIORITY

This application claims priority under 35 U.S.C. §119(e) to a U.S. Provisional Patent Application filed on Mar. 3, 2015 in the United States Patent and Trademark Office and assigned Ser. No. 62/127,674, and to a U.S. Provisional Patent Application filed on Jan. 4, 2016 in the United States Patent and Trademark Office and assigned Ser. No. 62/274,547, the entire contents of each of which are incorporated herein by reference.

FIELD

The present disclosure relates generally to an apparatus for and a method of channel quality prediction, and more particularly, to an apparatus for and a method of channel quality prediction by computing a channel quality metric using bounds for channels with multiple spatial streams.

BACKGROUND

Mutual information between a modulation-constrained input and its output through Gaussian channels is referred to as the mutual information per modulation symbol or the modulation-constrained capacity. Mutual information has been studied as a performance metric for Gaussian channels. However, it is difficult to compute the mutual information for multiple-input multiple-output (MIMO) Gaussian channels. In addition, a single-layer physical layer abstraction method may not capture the true gain of a nonlinear receiver.

SUMMARY

According to one embodiment, an apparatus includes a MIMO antenna; a transceiver connected to the MIMO antenna; and a processor configured to measure channel gain $H_k$, based on the received signal, where k is a sample index from 1 to K, $H_k$ is an m×n matrix of complex channel gain known to the receiver, measure noise variance $\sigma^2$ of a channel, calculate a per-sample channel quality metric $q(H_k, \sigma^2)$ using at least one bound of mutual information; reduce a dimension of a channel quality metric vector $(q(H_1, \sigma^2), \ldots, q(H_K, \sigma^2))$ by applying the dimension reduction function $g(.)$; and estimate a block error rate (BLER) as a function of a dimension reduced channel quality metric $g(q(H_1, \sigma^2), \ldots, q(H_K, \sigma^2))$.

According to one embodiment, a method includes receiving a signal by a MIMO antenna; determining, by a processor, a channel gain $H_k$, based on the received signal, where k is a sample index from 1 to K, $H_k$ is an m×n matrix of complex channel gain known to a receiver; determining, by the processor, a noise variance $\sigma^2$; estimating, by the processor, a per-sample channel quality metric $q(H_k, \sigma^2)$ using at least one bound of mutual information; reducing, by the processor, a dimension of a per-sample channel quality metric vector $(q(H_1, \sigma^2), \ldots \sigma^2))$ by applying a dimension reduction function $g(.)$; and obtaining, by the processor, an estimate of a BLER for a reduced dimension channel quality metric $g(q(H_1, \sigma^2), \ldots, q(H_K, \sigma^2))$.

According to one embodiment, an apparatus includes a channel gain $H_k$ measurement function block, where k is a sample index from 1 to K, $H_k$ is an m×n matrix of complex channel gain known to a receiver; a noise variance $\sigma^2$ measurement function block connected to the channel gain $H_k$ measurement function block; a per-sample channel quality metric $q(H_k, \sigma^2)$ function block connected to the noise variance $\sigma^2$ measurement function block and configured to use at least one bound of mutual information; a channel quality metric $q(H_k, \sigma^2)$ dimension reduction function block connected to the per-sample channel quality metric $q(H_k, \sigma^2)$ function block; and a block error rate (BLER) estimate function block connected to the channel quality metric $q(H_k, \sigma^2)$ dimension reduction function block.

According to one embodiment, a method includes determining, by a channel gain $H_k$ measurement function block, a channel gain $H_k$ based on a received signal, where k is a sample index from 1 to K, $H_k$ is an m×n matrix of complex channel gain known to a receiver; determining, by a noise variance $\sigma^2$ measurement function block connected to the channel gain $H_k$ measurement function block, a noise variance $\sigma^2$; estimating, by a per-sample channel quality metric $q(H_k, \sigma^2)$ function block connected to the noise variance $\sigma^2$ measurement function block, a per-sample channel quality metric $q(H_k, \sigma^2)$ using at least one bound of mutual information; reducing, by a channel quality metric $q(H_k, \sigma^2)$ dimension reduction function block connected to the per-sample channel quality metric $q(H_k, \sigma^2)$ function block, a dimension of the per-sample channel quality metric $q(H_k, \sigma^2)$; and obtaining, by a block error rate (BLER) estimate function block connected to the channel quality metric $q(H_k, \sigma^2)$ dimension reduction function block, an estimate of a BLER for the reduced dimension of the per-sample channel quality metric $q(H_k, \sigma^2)$.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

The present disclosure concerns an apparatus for and a method of a channel quality prediction by computing a channel quality metric using bounds for channels with multiple spatial streams. In addition, the present disclosure predicts a BLER.

Figure 1:
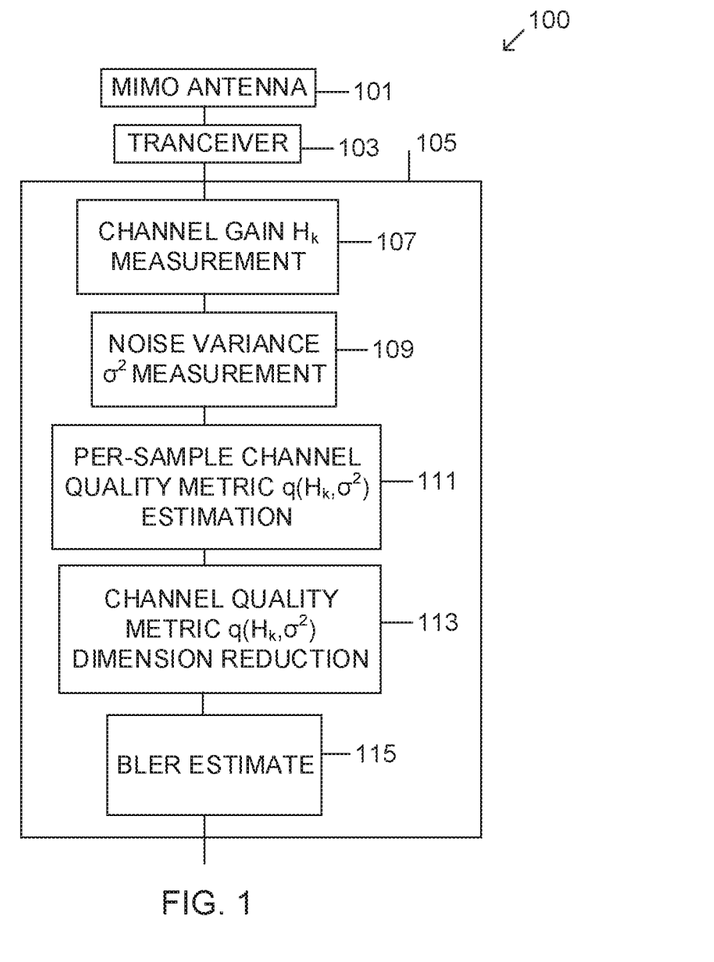
FIG. 1 is a block diagram of an apparatus for a transceiver to estimate a BLER according to an embodiment of the present disclosure.

FIG. 1 is a block diagram of an apparatus 100 for a transceiver (e.g., a terminal, and a base station) to estimate a BLER according to an embodiment of the present disclosure.

Referring to FIG. 1, the apparatus 100 includes a MIMO antenna 101, a transceiver 103, and a processor 105. In an embodiment of the present disclosure, the processor 105 may be replaced with a controller.

The MIMO antenna 101 receives a plurality of symbols or samples.

The transceiver 103 is connected to the MIMO antenna 101 and receives the samples received by the MIMO antenna 101.

The processor 105 is connected to the transceiver 103 and is configured to estimate the BLER by measuring channel gain $H_k$ 107, where k is a sample index from 1 to K, based on the received signal, measuring a noise variance $\sigma^2$ of a channel 109, estimating a per-sample or per-symbol channel quality metric $q(H_k, \sigma^2)$ 111, reducing a dimension of a channel quality metric vector $(q(H_1, \sigma^2), \ldots, q(H_K, \sigma^2))$ 113 by applying a dimension reduction function g(.) and estimating the BLER as a function of a dimension-reduced channel quality metric $g(q(H_1, \sigma^2), \ldots, q(H_K, \sigma^2))$ 115.

A multi-layer system used in the apparatus 100 may be modeled as in Equation (1) as follows:

$$Y_k = H_k X_k + Z_k, k = 1, \ldots, K, \tag{1}$$

where k is a sample index from 1 to K, $Y_k$ is a received signal vector, $H_k$ is an m×n matrix of complex channel gain known to the transceiver 103, $X_k$ is a transmitted equiprobable modulation symbol vector with unit power for each entry, and $Z_k$ is a zero-mean circularly symmetric independent and identically distributed complex Gaussian noise vector with variance $\sigma^2$ for each entry.

The channel gain $H_k$ is measured 107 by the processor 105 for each symbol or sample received.

The noise variance $\sigma^2$ is measured 109 by the processor 105 for each sample or symbol received.

The per-sample channel quality metric $q(H_k, \sigma^2)$ is estimated 111 by the processor 105 using at least one bound for mutual information.

In an embodiment of the present disclosure, approximate mutual information (also known as coded modulation capacity and modulation-constraint capacity) or approximate bit-interleaved coded modulation (BICM) capacity is used to estimate the per-sample channel quality metric $q(H_k, \sigma^2)$. Mutual information or BICM capacity is estimated using bounds. In the present disclosure, certain novel bounds are disclosed, but the present disclosure is not limited thereto. Other bounds may be used to estimate the mutual information or the BICM capacity.

Typical methods of estimating the per-sample channel quality metric $q(H_k, \sigma^2)$ may not capture the gain of a non-linear receiver, because the typical methods may have either been developed for a linear receiver or rely on parameters that must be tuned, which degrades performance.

In an embodiment of the present disclosure, tight bounds are disclosed. In addition, bounds may be combined to improve the approximation of the per-symbol or per-sample channel quality metric $q(H_k, \sigma^2)$.

A channel quality metric may be parameterized in one dimension using a model of a single-layer system as in Equation (2) as follows:

$$Y = hX + Z, \tag{2}$$

where Y is a received signal, h is a scaler of channel gain known to the transceiver 103, X is a transmitted modulation symbol with unit power, and Z is Gaussian noise with variance $\sigma^2$ for the transmitted modulation symbol X The sample index k of Equation (1) above is omitted in Equation (2) above.

For an input modulation, a function J may specify the one-dimensional channel quality metric as defined in Equation (3) as follows:

$$I(X;Y) \equiv J\left(\frac{|h|^2}{\sigma^2}\right), \tag{3}$$

where J may be pre-computed.

A channel quality metric may also be parameterized in multiple dimensions using, for example, a MIMO system model, where there are m transmitters (TXs) and n receivers (RXs) as in Equation (4) as follows:

$$Y = HX + Z, \tag{4}$$

where Y is a 1 by n matrix of n received signals, $H=[h_1, \ldots, h_m]$ is an n by m matrix of channel gain known to the n receivers, X is a 1 by m matrix of transmitted modulation symbols with unit power, and Z is a 1 by n matrix of Gaussian noise with variance $\sigma^2$ for the transmitted modulation symbols X. The sample index k of Equation (1) above is omitted in Equation (4) above.

Y may also be represented as in Equation (5) as follows:

$$\begin{bmatrix} Y_1 \\ \vdots \\ Y_n \end{bmatrix} = \begin{bmatrix} h_{11} & \cdots & h_{1m} \\ \vdots & \ddots & \vdots \\ h_{n1} & \cdots & h_{nm} \end{bmatrix} \begin{bmatrix} X_1 \\ \vdots \\ X_m \end{bmatrix} + \begin{bmatrix} Z_1 \\ \vdots \\ Z_n \end{bmatrix} \quad (5)$$

$$= \begin{bmatrix} h_{11} \\ \vdots \\ h_{n1} \end{bmatrix} X_1 + \ldots + \begin{bmatrix} h_{1m} \\ \vdots \\ h_{nm} \end{bmatrix} X_m + \begin{bmatrix} Z_1 \\ \vdots \\ Z_n \end{bmatrix}.$$

An equivalent system model may be obtained by determining H=QR and left-multiplying a complex conjugate of a unitary matrix Q*, where the "*" in Q* indicates that Q* is a complex conjugate of Q, as in Equation (6) as follows:

$$\bar{Y} = RX + \bar{Z}, \quad (6)$$

Y may also be represented as in Equation (7) as follows:

$$\begin{bmatrix} \bar{Y}_1 \\ \vdots \\ \bar{Y}_n \end{bmatrix} = \begin{bmatrix} r_{11} & \cdots & r_{1m} \\ 0 & r_{22} & \vdots \\ \vdots & \vdots & \vdots \end{bmatrix} \begin{bmatrix} X_1 \\ \vdots \\ X_m \end{bmatrix} + \begin{bmatrix} \bar{Z}_1 \\ \vdots \\ \bar{Z}_n \end{bmatrix} \quad (7)$$

$$= \begin{bmatrix} r_{11} \\ 0 \\ \vdots \end{bmatrix} X_1 + \ldots + \begin{bmatrix} r_{1m} \\ r_{2m} \\ \vdots \end{bmatrix} X_m + \begin{bmatrix} \bar{Z}_1 \\ \vdots \\ \bar{Z}_n \end{bmatrix},$$

where $\bar{Z}_i$ is statistically equivalent to $Z_i$ and where $\|h_i\|=\|r_i\|$ indicates a column-wise power identity.

Factoring or decomposing matrix H into an orthogonal matrix Q and an upper triangular matrix R (i.e., QR decomposition) may be obtained from a column-swapped channel matrix $\tilde{H}=\tilde{Q}\tilde{R}$ and a row-swapped transmitted signal vector $\tilde{X}$ with the same swap. Applying this QR results in Equations (8) and (9) as follows:

$$\tilde{Y} = \tilde{R}\tilde{X} + \tilde{Q}^*Z, \quad (8)$$

$$\tilde{Q}^*Y = \begin{bmatrix} \tilde{r}_{11} & \cdots & (\tilde{r}')_{1m} \\ 0 & \tilde{r}_{22} & \vdots \\ \vdots & \vdots & \vdots \end{bmatrix} \tilde{X} + \tilde{Q}^*Z. \quad (9)$$

In an embodiment of the present disclosure, lower bounds of mutual information are obtained by cross term manipulation (e.g., substituting cross terms with zeros) as in Equation (10) as follows:

$$\begin{bmatrix} \bar{Y}_1 \\ \vdots \\ \bar{Y}_n \end{bmatrix} = \begin{bmatrix} r_{11} & \cdots & r_{1m} \\ 0 & r_{22} & \vdots \\ \vdots & \vdots & \vdots \end{bmatrix} \begin{bmatrix} X_1 \\ \vdots \\ X_m \end{bmatrix} + \begin{bmatrix} \bar{Z}_1 \\ \vdots \\ \bar{Z}_n \end{bmatrix} \rightarrow \begin{bmatrix} \bar{Y}_1 \\ \vdots \\ \bar{Y}_n \end{bmatrix} \quad (10)$$

$$= \begin{bmatrix} r_{11} & \cdots & 0 \\ 0 & r_{22} & \vdots \\ \vdots & \vdots & \vdots \end{bmatrix} \begin{bmatrix} X_1 \\ \vdots \\ X_m \end{bmatrix} + \begin{bmatrix} \bar{Z}_1 \\ \vdots \\ \bar{Z}_n \end{bmatrix}.$$

A formal derivation using the chain rule of mutual information is represented in Equation (11) as follows:

$$I(X;Y) = I(X;\bar{Y}) \geq I(X_1;\bar{Y}_1 | X_2, \ldots, X_m) + \quad (11)$$

$$I(X_2, \bar{Y}_2 | X_3, \ldots, X_m) + \ldots + I(X_{\min\{m,n\}};$$

$$\bar{Y}_{\min\{m,n\}} | X_{\min\{m,n\}+1}, \ldots, X_m)$$

$$= J_1\left(\frac{|r_{11}|^2}{\sigma^2}\right) + \ldots + J_m\left(\frac{|r_{mm}|^2}{\sigma^2}\right),$$

where $J_i$ is a single-layer mutual information for input $X_i$, i.e., J as defined in Equation (3) above for $X=X_i$. This may also be applied to any column-swapped channel matrix $\tilde{H}$.

In an embodiment of the present disclosure, multiple lower bounds may be combined to obtain a single tight bound as represented by Equation (12) as follows:

$$I(X;Y) \geq \max\left\{J_1\left(\frac{|r_{11}|^2}{\sigma^2}\right) + \ldots + J_m\left(\frac{|r_{mm}|^2}{\sigma^2}\right),\right. \quad (12)$$

$$\left. J_1\left(\frac{|\tilde{r}_{11}|^2}{\sigma^2}\right) + \ldots + J_m\left(\frac{|\tilde{r}_{mm}|^2}{\sigma^2}\right), \ldots \right\}.$$

In an embodiment of the present disclosure, an upper bound on the mutual information may be obtained by orthogonalization, where two channel vectors are assumed to be orthogonal (i.e., $h_i^* h_j = 0$, for $i \neq j$). The mutual information has an upper bound as represented in Equation (13) as follows:

$$I(X;Y) \leq I(X_1; Y|X_2, \ldots, X_m) + \ldots + I(X_m;$$
$$Y|X_1, \ldots, X_{m-1}). \quad (13)$$

Equation (13) may also be expressed as in Equation (14) as follows:

$$I(X;Y) \leq J_1\left(\frac{|h_1|^2}{\sigma^2}\right) + \ldots + J_m\left(\frac{|h_m|^2}{\sigma^2}\right). \quad (14)$$

In an embodiment of the present disclosure, an upper bound on the mutual information may be obtained by element-wise Gaussian substitution as in Equation (15) as follows:

$$I(X;Y) = I(X_1, \ldots, X_m; Y) \leq I(\hat{X}_1, \ldots, \hat{X}_m; Y), \quad (15)$$

where $\hat{X}_i$ is a circularly symmetric complex Gaussian random variable with the same variance, i.e., $\text{Var}[\hat{X}_i] = \text{Var}[X_i]$. The property of Equation (15) holds in an element-wise manner as represented in Equation (16) as follows:

$$I(X_1, X_m; Y) \leq I(X_1, X_2, \ldots, X_{m-1}, \hat{X}_m; Y) \leq \ldots \leq I(X_1, \hat{X}_2, \ldots, \hat{X}_{m-1}, \hat{X}_m; Y) \leq I(\hat{X}_1, \ldots, \hat{X}_m; Y). \quad (16)$$

Upper bounds may be computed as represented in Equation (17) as follows:

$$I(X_1, \hat{X}_2; Y) = [I(X_1; Y) \text{ with } \hat{X}_2, \ldots, \hat{X}_m \text{ interference}] + I(\hat{X}_2, \ldots, \hat{X}_m; Y|X_1). \quad (17)$$

Without loss of generality and assuming a zero-mean, $[I(X_1; Y)$ with $\hat{X}_2, \ldots, \hat{X}_m$ interference] may be represented as in Equation (18) and $I(\hat{X}_2, \ldots, \hat{X}_m; Y|X_1)$ may be represented as in Equation (19) as follows:

$$[I(X_1; Y) \text{ with } \hat{X}_2, \ldots , \hat{X}_m \text{ inteference}] = J_1\left(h_1^*(H_1 H_1^* + \sigma^2 I)^{-1} h_1\right), \quad (18)$$

and $$I(\hat{X}_2, \ldots , \hat{X}_m; Y | X_1) = \log_2\det\left(I + \frac{H_1^* H_1}{\sigma^2}\right), \quad (19)$$

where $H_i = [h_i \ldots h_{i-1} h_{i+i} \ldots h_m]$.

In an embodiment of the present disclosure, multiple element-wise Gaussian substitution upper bounds may be combined to obtain a single tight bound as represented by Equation (20) as follows, but the present disclosure is not limited thereto:

$$I(X; Y) \leq \min\left\{ J_1\left(h_1^*(H_1 H_1^* + \sigma^2 I)^{-1} h_1\right) + \log_2\det\left(I + \frac{H_1^* H_1}{\sigma^2}\right), \ldots , \right.$$

$$\left. J_m\left(h_m^*(H_m H_m^* + \sigma^2 I)^{-1} h_m\right) + \log_2\det\left(I + \frac{H_m^* H_m}{\sigma^2}\right)\right\}. \quad (20)$$

A per-sample channel quality metric $q(x)$ may be computed by the processor 105 using at least one of the bounds described above. For example, a per-sample channel quality metric $q(x)$ may be computed by the processor 105 as the minimum of two upper bounds, where one of the upper bounds is computed by orthogonalization and the other upper bound is computed by element-wise Gaussian substitution as represented in Equation (21) as follows, but the present disclosure is not limited thereto:

$$q(H, \sigma^2) = \min\left[ J_1\left(\frac{\|h_1\|^2}{\sigma^2}\right) + \ldots + J_m\left(\frac{\|h_m\|^2}{\sigma^2}\right), \right. \quad (21)$$

$$\min\left\{ J_1\left(h_1^*(H_1 H_1^* + \sigma^2 I)^{-1} h_1\right) + \log_2\det\left(I + \frac{H_1^* H_1}{\sigma^2}\right), \ldots , \right.$$

$$\left.\left. J_m\left(h_m^*(H_m H_m^* + \sigma^2 I)^{-1} h_m\right) + \log_2\det\left(I + \frac{H_m^* H_m}{\sigma^2}\right)\right\}\right].$$

The dimension of the channel quality metric vector $(q(H_1, \ldots, q(H_K, \sigma^2))$ is reduced 113 by applying a dimension reduction function $g(.)$ by the processor 105. In an embodiment of the present disclosure, the dimension of the channel quality metric vector $(q(H_1, \sigma^2), \ldots, q(H_K, \sigma^2))$ is reduced 113 by the processor 105 to one dimension, but the present disclosure is not limited thereto. In an embodiment of the present disclosure, the dimension of the channel quality metric vector $(q(H_1, \sigma^2), \ldots, q(H_K, \sigma^2))$ is reduced 113 by the processor 105 to one dimension by computing $1/K \sum_{k=1}^{K} q(H_k, \sigma^2)$, but the present disclosure is not limited thereto. Other computations for reducing the dimension of the channel quality metric vector $(q(H_1, \sigma^2), \ldots, q(H_K, \sigma^2))$ may be used.

The BLER is estimated 115 by the processor 105 based on a reduced dimension channel quality metric $g(q(H_1, \sigma^2), \ldots, q(H_K, \sigma^2))$.

Fixing a transmission scheme and a receiver algorithm implementation specifies a BLER as in Equation (22) as follows:

$$\text{BLER} = f(H_1, \ldots, H_K, \sigma^2), \quad (22)$$

where BLER is a probability mass function for block error.

In an embodiment of the present disclosure, the BLER is estimated 115 by the processor 105 as in Equation (23) as follows:

$$\text{BLER} \cong p\left(\frac{1}{K}\sum_{k=1}^{K} q(H_k, \sigma^2)\right), \quad (23)$$

where p is a one-dimensional BLER function, q is a channel state information (CSI) metric function, and $q(H_k, \sigma^2)$ is a per-symbol or per-sample channel quality metric. The function p may be computed through simulation and may be pre-computed. However, the present disclosure is not limited to using $$\frac{1}{K}\sum_{k=1}^{K} q(H_k, \sigma^2)$$

to estimate a BLER. Other estimations may be used.

In an embodiment of the present disclosure, the function p may be pre-computed for all possible values of the reduced dimension channel quality metric $g(q(H_1, \sigma^2), \ldots, q(H_K, \sigma^2))$ $$\left(\text{e.g. } \frac{1}{K}\sum_{k=1}^{K} q(H_k, \sigma^2)\right),$$

or any other estimation method used, and stored in a look-up table to improve performance and reduce power consumption. That is, after the dimension of the channel quality metric vector $(q(H_1, \sigma^2), \ldots, q(H_K, \sigma^2))$ is reduced 113 by applying the dimension reduction function $g(.)$ by the processor 105, the BLER is estimated 115 by the processor 105, where the processor 105 may look up the corresponding BLER estimate in a look-up table without having to spend time and consume power computing it. The resulting BLER estimate may then be stored in memory.

Figure 2:
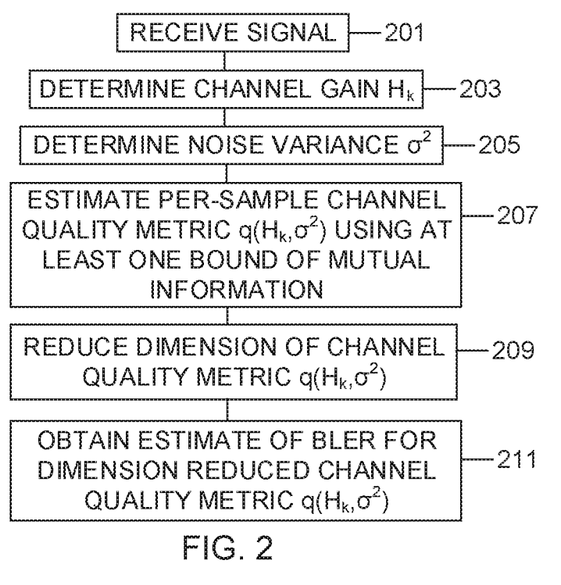
FIG. 2 is a flowchart of a method of a transceiver to estimate a BLER according to an embodiment of the present disclosure.

FIG. 2 is a flowchart of a method of a transceiver for estimating a BLER according to an embodiment of the present disclosure.

Referring to FIG. 2, a signal is received in 201.

In 203, channel gain $H_k$ is determined, where k is a sample index from 1 to K, based on the received signal, by a processor (such as the processor 105 in FIG. 1) for each symbol or sample received.

In 205, a noise variance $\sigma^2$ for each sample or symbol received is determined by a processor (such as the processor 105 in FIG. 1).

In 207, a per-sample channel quality metric $q(H_k, \sigma^2)$ is estimated by a processor (such as the processor 105 in FIG. 1). The per-sample channel quality metric $q(H_k, \sigma^2)$ is estimated using at least one bound for mutual information, but the present disclosure is not limited thereto. A bound may be as described above, or another bound may be used.

In an embodiment of the present disclosure, multiple lower bounds may be combined to obtain a single tight bound as described above, but the present disclosure is not limited thereto. An upper bound on the mutual information may be obtained by orthogonalization, element-wise Gaussian substitution as described above, but the present disclosure is not limited thereto.

In an embodiment of the present disclosure, multiple element-wise Gaussian substitution upper bounds may be combined to obtain a single tight bound as described above, but the present disclosure is not limited thereto. For example, a per-sample channel quality metric q(x) may be computed using at least one of the bounds described above, but the present disclosure is not limited thereto. For example, a per-sample channel quality metric q(x) may be computed as the minimum of two upper bounds, where one of the upper bounds is computed by orthogonalization and the other upper bound is computed by element-wise Gaussian substitution as described above, but the present disclosure is not limited thereto.

In 209, a dimension of a channel quality metric vector $(q(H_1, \sigma^2), \ldots, q(H_K, \sigma^2))$ is reduced by applying a dimension reduction function g(.) by a processor (such as the processor 105 in FIG. 1). In an embodiment of the present disclosure, the dimension of the channel quality metric vector $(q(H_1, \sigma^2), \ldots, q(H_K, \sigma^2))$ is reduced to one dimension, but the present disclosure is not limited thereto. The dimension of the channel quality metric vector $(q(H_1, \sigma^2), \ldots, q(H_K, \sigma^2))$ may be reduced to one dimension by computing $$\frac{1}{K}\sum_{k=1}^{K} q(H_k, \sigma^2),$$

but the present disclosure is not limited thereto. Other computations for reducing the dimension of the channel quality metric vector $(q(H_1, \sigma^2), \ldots, q(H_K, \sigma^2))$ may be used.

In 211, a BLER is estimated as a function of a dimension reduced channel quality metric $g((q(H_1, \sigma^2), \ldots, q(H_K, \sigma^2)))$ by a processor (such as the processor 105 in FIG. 1). In an embodiment of the present disclosure, the BLER is estimated as in Equation (23) described above, where the BLER may be computed through simulation and may be pre-computed. However, the present disclosure is not limited to using $$\frac{1}{K}\sum_{k=1}^{K} q(H_k, \sigma^2)$$

to estimate the BLER. Other estimations may be used. The function p may be pre-computed for all possible values of the reduced dimension channel quality metric $g((q(H_1, \sigma^2), \ldots, q(H_K, \sigma^2)))$ $$\left(e.g.\ \frac{1}{K}\sum_{k=1}^{K} q(H_k, \sigma^2)\right),$$

or any other estimation method used, and stored in a look-up table to improve performance and reduce power consumption as described above, but the present disclosure is not limited thereto.

Figure 3:
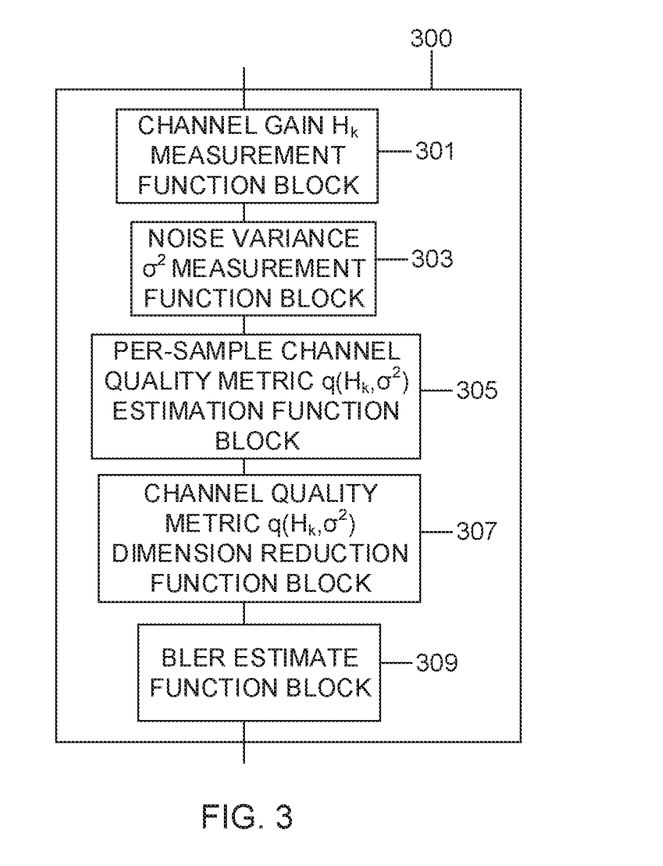
FIG. 3 is a block diagram of an apparatus for estimating a BLER according to an embodiment of the present disclosure.

FIG. 3 is block diagram of an apparatus 300 for estimating a BLER according to an embodiment of the present disclosure.

Referring to FIG. 3, the apparatus 300 includes a channel gain $H_k$ measurement function block 301, where k is a sample index from 1 to K, a noise variance $\sigma^2$ measurement function block 303, a per-sample or per-symbol channel quality metric $q(H_k, \sigma^2)$ estimation function block 305, a channel quality metric $q(H_k, \sigma^2)$ dimension reduction function block 307, and a BLER estimate function block 309.

A multi-layer system used in the apparatus 300 may be modeled as in Equation (1) above.

The channel gain $H_k$ measurement function block 301 measures channel gain $H_k$ of a channel for each symbol or sample received.

The noise variance $\sigma^2$ measurement function block 303 is connected to the channel gain $H_k$ measurement function block 301 and measures the noise variance $\sigma^2$ for each sample or symbol received.

The per-sample channel quality metric $q(H_k, \sigma^2)$ estimation function block 305 is connected to the noise variance $\sigma^2$ measurement function block 303 and estimates the per-sample channel quality metric $q(H_k, \sigma^2)$. The per-sample channel quality metric $q(H_k, \sigma^2)$ estimation function block 305 estimates the per-sample channel quality metric $q(H_k, \sigma^2)$ using at least one bound for mutual information.

In an embodiment of the present disclosure, approximate mutual information (also known as coded modulation capacity and modulation-constraint capacity) or approximate bit-interleaved coded modulation (BICM) capacity is used to estimate the per-sample channel quality metric $q(H_k, \sigma^2)$. Mutual information or BICM capacity is estimated using bounds. In the present disclosure, certain novel bounds are disclosed, but the present disclosure is not limited thereto. Other bounds may be used to estimate the mutual information or the BICM capacity.

Typical methods of estimating the per-sample channel quality metric $q(H_k, \sigma^2)$ may not capture the gain of a non-linear receiver, because the typical methods may have either been developed for a linear receiver or rely on parameters that must be tuned, which degrades performance.

In an embodiment of the present disclosure, tight bounds are disclosed. In addition, bounds may be combined to improve the approximation of the per-symbol or per-sample channel quality metric $q(H_k, \sigma^2)$.

A channel quality metric may be parameterized in one dimension using a model of a single-layer system as in Equation (2) above.

For an input modulation, a function J may specify the one-dimensional channel quality metric as defined in Equation (3) as above.

A channel quality metric may also be parameterized in multiple dimensions using, for example, a MIMO system model, where there are m transmitters (TXs) and n receivers (RXs) as in Equation (4) as above. Y may also be represented as in Equation (5) above.

An equivalent system model may be obtained by determining H=QR and left-multiplying a complex conjugate of a unitary matrix Q*, where the "*" in Q* indicates that Q* is a complex conjugate of Q, as in Equation (6) as above. Y may also be represented as in Equation (7) above.

Factoring or decomposing matrix H into an orthogonal matrix Q and an upper triangular matrix R (i.e., QR decomposition) may be obtained from a column-swapped channel matrix $\tilde{H}=\tilde{Q}\tilde{R}$ and a row-swapped transmitted signal vector $\tilde{X}$ with the same swap. Applying this QR results in Equations (8) and (9) as above.

In an embodiment of the present disclosure, lower bounds of mutual information are obtained by cross term manipulation (e.g. substituting cross terms with zeros) as in Equation (10) as above.

A formal derivation using the chain rule of mutual information is represented in Equation (11) as above.

In an embodiment of the present disclosure, multiple lower bounds may be combined to obtain a single tight bound as represented by Equation (12) as above.

In an embodiment of the present disclosure, an upper bound on the mutual information may be obtained by orthogonalization, where two channel vectors are assumed to be orthogonal (i.e., $h_i^* h_j = 0$, for $i \neq j$). The mutual information has an upper bound as represented in Equation (13) as above. Equation (13) may also be expressed as in Equation (14) as above.

In an embodiment of the present disclosure, an upper bound on the mutual information may be obtained by element-wise Gaussian substitution as in Equation (15) as above. The property of Equation (15) holds in an element-wise manner as represented in Equation (16) as above.

Upper bounds may be computed as represented in Equation (17) as follows:

$$I(X_1, \hat{X}_2; Y) = [I(X_1; Y) \text{ with } \hat{X}_2, \ldots, \hat{X}_m \text{ interference}] + I(\hat{X}_2, \ldots, \hat{X}_m; Y | X_1). \quad (17)$$

Without loss of generality and assuming a zero-mean, $[I(X_1; Y) \text{ with } \hat{X}_2, \ldots, \hat{X}_m \text{ interference}]$ may be represented as in Equation (18) and $I(\hat{X}_2, \ldots, \hat{X}_m; Y | X_1)$ may be represented as in Equation (19) as above.

In an embodiment of the present disclosure, multiple element-wise Gaussian substitution upper bounds may be combined to obtain a single tight bound as represented by Equation (20) as above, but the present disclosure is not limited thereto.

A per-sample channel quality metric q(x) may be computed using at least one of the bounds described above. For example, a per-sample channel quality metric q(x) may be computed as the minimum of two upper bounds, where one of the upper bounds is computed by orthogonalization and the other upper bound is computed by element-wise Gaussian substitution as represented in Equation (21) as above, but the present disclosure is not limited thereto.

The channel quality metric $q(H_k, \sigma^2)$ dimension reduction function block 307 is connected to the per-sample channel quality metric $q(H_k, \sigma^2)$ estimation function block 305 and reduces the dimension of the channel quality metric $q(H_k, \sigma^2)$. In an embodiment of the present disclosure, the channel quality metric $q(H_k, \sigma^2)$ dimension reduction function block 307 reduces the dimension of the channel quality metric vector $(q(H_1, \sigma^2), \ldots, q(H_K, \sigma^2))$ to one dimension by applying a dimension reduction function g(.), but the present disclosure is not limited thereto. In an embodiment of the present disclosure, the channel quality metric $q(H_k, \sigma^2)$ dimension reduction function block 307 reduces the dimension of the channel quality metric vector $(q(H_1, \sigma^2), \ldots, q(H_K, \sigma^2))$ to one dimension by computing $$\frac{1}{K} \sum_{k=1}^{K} q(H_k, \sigma^2),$$

but the present disclosure is not limited thereto. Other computations for reducing the dimension of the channel quality metric vector $(q(H_1, \sigma^2), \ldots, q(H_K, \sigma^2))$ may be used.

The BLER estimate function block 309 is connected to the channel quality metric $q(H_k, \sigma^2)$ dimension reduction function block 307 and estimates the BLER based on the reduced dimension channel quality metric $g(q(H_1, \sigma^2), \ldots, q(H_K, \sigma^2))$.

Fixing a transmission scheme and a receiver algorithm implementation specifies a BLER as in Equation (22) as above.

In an embodiment of the present disclosure, the BLER estimate function block 309 estimates the BLER as in Equation (23) above. However, the present disclosure is not limited to using $$\frac{1}{K} \sum_{k=1}^{K} q(H_k, \sigma^2),$$

to estimate a BLER. Other estimations may be used.

In an embodiment of the present disclosure, the function p may be pre-computed for all possible values of the reduced dimension channel quality metric $g(q(H_1, \sigma^2), \ldots, q(H_K, \sigma^2))$ $$\left( \text{e.g. } \frac{1}{K} \sum_{k=1}^{K} q(H_k, \sigma^2) \right),$$

or any other estimation method used, and stored in a look-up table to improve performance and reduce power consumption. That is, after the channel quality metric $q(H_k, \sigma^2)$ dimension reduction function block 307 generates a reduced dimension channel quality metric vector $(q(H_1, \sigma^2), \ldots, q(H_K, \sigma^2))$, the BLER estimate function block 309 may look up the corresponding BLER estimate in a look-up table without having to spend time and consume power computing it. The resulting BLER estimate may then be stored in memory.

Figure 4:
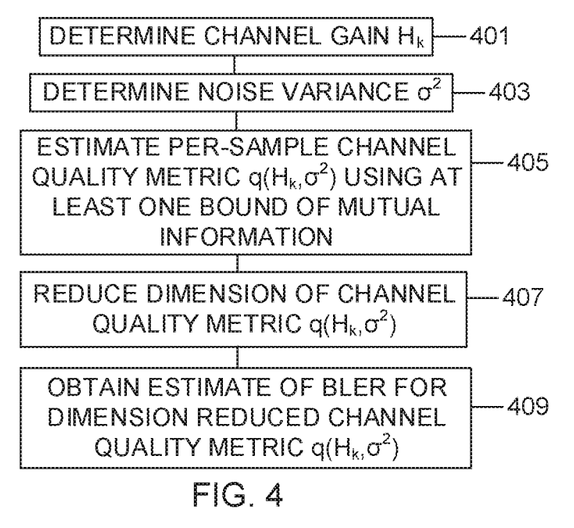
FIG. 4 is a flowchart of a method of estimating a BLER according to an embodiment of the present disclosure.

FIG. 4 is a flowchart of a method of estimating a BLER according to an embodiment of the present disclosure.

Referring to FIG. 4, a channel gain $H_k$ is determined in 401, where k is a sample index from 1 to K, by a channel gain $H_k$ measurement function block (such as block 101 in FIG. 1) for each symbol or sample received.

In 403, a noise variance $\sigma^2$ for each sample or symbol received is determined by a noise variance measurement function block (such as block 103 in FIG. 1).

In 405, a per-sample channel quality metric $q(H_k, \sigma^2)$ is estimated by a per-sample channel quality metric $q(H_k, \sigma^2)$ estimation function block (such as block 105 in FIG. 1). The per-sample channel quality metric $q(H_k, \sigma^2)$ is estimated using at least one bound for mutual information, but the present disclosure is not limited thereto. A bound may be as described above, or another bound may be used.

In an embodiment of the present disclosure, multiple lower bounds may be combined to obtain a single tight bound as described above, but the present disclosure is not limited thereto. An upper bound on the mutual information may be obtained by orthogonalization, element-wise Gaussian substitution as described above, but the present disclosure is not limited thereto.

In an embodiment of the present disclosure, multiple element-wise Gaussian substitution upper bounds may be combined to obtain a single tight bound as described above, but the present disclosure is not limited thereto. For example, a per-sample channel quality metric q(x) may be computed using at least one of the bounds described above, but the present disclosure is not limited thereto. For example, a per-sample channel quality metric q(x) may be computed as the minimum of two upper bounds, where one of the upper bounds is computed by orthogonalization and the other upper bound is computed by element-wise Gaussian substitution as described above, but the present disclosure is not limited thereto.

In 407, a dimension of the channel quality metric vector $(q(H_1, \sigma^2), \ldots, q(H_K, \sigma^2))$ is reduced by applying a dimension reduction function $g(.)$ by a channel quality metric $q(H_k, \sigma^2)$ dimension reduction function block (such as block 107 in FIG. 1). In an embodiment of the present disclosure, the dimension of the channel quality metric vector $(q(H_1, \sigma^2), \ldots, q(H_K, \sigma^2))$ is reduced to one dimension, but the present disclosure is not limited thereto. The dimension of the channel quality metric vector $(q(H_1, \sigma^2), \ldots, q(H_K, \sigma^2))$ is reduced to one dimension by computing $$\frac{1}{K}\sum_{k=1}^{K} q(H_k, \sigma^2),$$

but the present disclosure is not limited thereto. Other computations for reducing the dimension of the channel quality metric vector $(q(H_1, \sigma^2), \ldots, q(H_K, \sigma^2))$ may be used.

In 409, a BLER is estimated by a BLER estimate function block (such as block 109 in FIG. 1) based on the reduced dimension channel quality metric $g(q(H_1, \sigma^2), \ldots, q(H_K, \sigma^2))$. In an embodiment of the present disclosure, the BLER is estimated as in Equation (23) described above, where the BLER may be computed through simulation and may be pre-computed. However, the present disclosure is not limited to using $$\frac{1}{K}\sum_{k=1}^{K} q(H_k, \sigma^2),$$

to estimate a BLER. Other estimations may be used. The function p may be pre-computed for all possible values of the reduced dimension channel quality metric $g(q(H_1, \sigma^2), \ldots, q(H_K, \sigma^2))$ $$\left(\text{e.g. } \frac{1}{K}\sum_{k=1}^{K} q(H_k, \sigma^2)\right),$$

or any other estimation method used, and stored in a look-up table to improve performance and reduce power consumption as described above, but the present disclosure is not limited thereto.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
   a multiple input multiple output (MIMO) antenna;
   a transceiver connected to the MIMO antenna; and
   a processor configured to measure channel gain $H_k$, based on a received signal, where k is a sample index from 1 to K, $H_k$ is an m×n matrix of complex channel gain known to the transceiver, measure noise variance $\sigma^2$ of a channel, calculate a per-sample channel quality metric $q(H_k, \sigma^2)$ using at least one bound of mutual information; reduce a dimension of a channel quality metric vector $(q(H_1, \sigma^2), \ldots, q(H_K, \sigma^2))$ by applying a dimension reduction function $g(.)$; and estimate a block error rate (BLER) as a function of a dimension reduced channel quality metric $g(q(H_1, \sigma^2), \ldots, q(H_K, \sigma^2))$.

2. The apparatus of claim 1, wherein the at least one bound includes one of a lower bound as follows:

$$I(X;Y) =$$
$$I(X;\overline{Y}) \geq I(X_1;\overline{Y}_1 \mid X_2, \ldots, X_m) + I(X_2;\overline{Y}_2 \mid X_3, \ldots, X_m) + \ldots +$$
$$I(X_{\min\{m,n\}};\overline{Y}_{\min\{m,n\}} \mid X_{\min\{m,n\}+1}, \ldots, X_m) =$$
$$J_1\left(\frac{|r_{11}|^2}{\sigma^2}\right) + \ldots + J_m\left(\frac{|r_{mn}|^2}{\sigma^2}\right),$$

where X is a 1 by m matrix of transmitted modulation symbols with unit power, Y is a 1 by n matrix of n received signals, $J_i$ is a single-layer mutual information for input $X_1$, $Z_k$ is a zero-mean circularly symmetric independent and identically distributed complex Gaussian noise vector with variance $\sigma^2$ for each entry, $\overline{Z}_i$ is statistically equivalent to $Z_i$, min( ) is a function for returning a minimum variable, and $$\begin{bmatrix} \overline{Y}_1 \\ \vdots \\ \overline{Y}_n \end{bmatrix} = \begin{bmatrix} r_{11} & \cdots & 0 \\ 0 & r_{22} & \vdots \\ \vdots & \vdots & \vdots \end{bmatrix} \begin{bmatrix} X_1 \\ \vdots \\ X_m \end{bmatrix} + \begin{bmatrix} \overline{Z}_1 \\ \vdots \\ \overline{Z}_n \end{bmatrix};$$

and $$I(X;Y) \geq$$
$$\max\left\{J_1\left(\frac{|r_{11}|^2}{\sigma^2}\right) + \ldots + J_m\left(\frac{|r_{mn}|^2}{\sigma^2}\right), J_1\left(\frac{|\tilde{r}_{11}|^2}{\sigma^2}\right) + \ldots + J_m\left(\frac{|\tilde{r}_{mn}|^2}{\sigma^2}\right), \ldots \right\},$$

where $\|h_i\|=\|r_i\|$ indicates a column-wise power identity.

3. The apparatus of claim 1, wherein the at least one bound includes one of an upper bound by orthogonalization and an upper bound by element-wise Gaussian substitution, respectively, as follows:

$$I(X;Y) \leq I(X_1;Y|X_2, \ldots, X_m) + \ldots + I(X_m; Y|X_1, \ldots, X_{m-1}),$$

where X is a 1 by m matrix of transmitted modulation symbols with unit power, and Y is a 1 by n matrix of n received signals; and $$I(X;Y) \leq \min\left\{J_1\left(h_1^*(H_1 H_1^* + \sigma^2 I)^{-1} h_1\right) + \log_2\det\left(I + \frac{H_1^* H_1}{\sigma^2}\right), \ldots, \right.$$
$$\left. J_m\left(h_m^*(H_m H_m^* + \sigma^2 I)^{-1} h_m\right) + \log_2\det\left(I + \frac{H_m^* H_m}{\sigma^2}\right)\right\},$$

where $H_i \equiv [h_i \ldots h_{i-1} h_{i+1} \ldots h_m]$, $J_i$ is a single-layer mutual information for input $X_1$, min( ) is a function for returning a minimum variable, "*" denotes a complex conjugate, $\log_2$ is a logarithm base 2, and det( ) is a determinant function.

4. The apparatus of claim 1, wherein the processor is further configured to reduce the dimension of the channel quality metric vector $(q(H_1, \sigma^2), \ldots, q(H_K, \sigma^2))$ by computing $$\frac{1}{K} \sum_{k=1}^{K} q(H_k, \sigma^2).$$

5. The apparatus of claim 1, wherein the processor is further configured to estimate the BLER by computing $$BLER \cong p\left(\frac{1}{K} \sum_{k=1}^{K} q(H_k, \sigma^2)\right),$$

where p( ) is a function.

6. A method, comprising:
  receiving a signal by a multiple input multiple output (MIMO) antenna;
  determining, by a processor, a channel gain $H_k$, based on the received signal, where k is a sample index from 1 to K, $H_k$ is an m×n matrix of complex channel gain known to a receiver;
  determining, by the processor, a noise variance $\sigma^2$;
  estimating, by the processor, a per-sample channel quality metric $q(H_k, \sigma^2)$ using at least one bound of mutual information;
  reducing, by the processor, a dimension of the per-sample channel quality metric vector $(q(H_1, \sigma^2), \ldots, q(H_K, \sigma^2))$ by applying a dimension reduction function $g(.)$; and
  obtaining, by the processor, an estimate of a BLER for a reduced dimension channel quality metric $g(q(H_1, \sigma^2), \ldots, q(H_K, \sigma^2))$.

7. The method of claim 6, wherein the at least one bound includes one of a lower bound as follows:

$$I(X; Y) = I(X; \overline{Y}) \geq$$
$$I(X_1; \overline{Y}_1 | X_2, \ldots, X_m) + I(X_2; \overline{Y}_2 | X_3, \ldots, X_m) + \ldots +$$
$$I(X_{\min\{m,n\}}; \overline{Y}_{\min\{m,n\}} | X_{\min\{m,n\}+1}, \ldots, X_m) =$$
$$J_1\left(\frac{|r_{11}|^2}{\sigma^2}\right) + \ldots + J_m\left(\frac{|r_{mm}|^2}{\sigma^2}\right),$$

where X is a 1 by m matrix of transmitted modulation symbols with unit power, Y is a 1 by n matrix of n received signals, $J_i$ is a single-layer mutual information for input $X_1$, $Z_k$ is a zero-mean circularly symmetric independent and identically distributed complex Gaussian noise vector with variance $\sigma^2$ for each entry, $\overline{Z}_i$ is statistically equivalent to $Z_i$, min( ) is a function for returning a minimum variable, and $$\begin{bmatrix} \overline{Y}_1 \\ \vdots \\ \overline{Y}_n \end{bmatrix} = \begin{bmatrix} r_{11} & \cdots & 0 \\ 0 & r_{22} & \vdots \\ \vdots & \vdots & \vdots \end{bmatrix} \begin{bmatrix} X_1 \\ \vdots \\ X_m \end{bmatrix} + \begin{bmatrix} \overline{Z}_1 \\ \vdots \\ \overline{Z}_n \end{bmatrix}; \text{ and}$$

$$I(X; Y) \geq \max\left\{ J_1\left(\frac{|r_{11}|^2}{\sigma^2}\right) + \ldots + J_m\left(\frac{|r_{mm}|^2}{\sigma^2}\right), \right.$$
$$\left. J_1\left(\frac{|\tilde{r}_{11}|^2}{\sigma^2}\right) + \ldots + J_m\left(\frac{|\tilde{r}_{mm}|^2}{\sigma^2}\right), \ldots \right\},$$

where $\|h_i\| = \|r_i\|$ indicates a column-wise power identity.

8. The method of claim 6, wherein the at least one bound includes one of an upper bound by orthogonalization and element-wise Gaussian substitution, respectively, as follows:

$$I(X;Y) \leq I(X_1; Y | X_2, \ldots, X_m) + \ldots + I(X_m; Y | X_1, \ldots, X_{m-1}),$$

where X is a 1 by m matrix of transmitted modulation symbols with unit power, and Y is a 1 by n matrix of n received signals; and $$I(X; Y) \leq \min\left\{ J_1\left(h_1^*(H_1 H_1^* + \sigma^2 I)^{-1} h_1\right) + \log_2 \det\left(I + \frac{H_1^* H_1}{\sigma^2}\right), \ldots, \right.$$
$$\left. J_m\left(h_m^*(H_m H_m^* + \sigma^2 I)^{-1} h_m\right) + \log_2 \det\left(I + \frac{H_m^* H_m}{\sigma^2}\right)\right\},$$

where $H_i \equiv [h_i \ldots h_{i-1} h_{i+1} \ldots h_m]$, $J_i$ is a single-layer mutual information for input $X_1$, min( ) is a function for returning a minimum variable, "*" denotes a complex conjugate, $\log_2$ is a logarithm base 2, and det( ) is a determinant function.

9. The method of claim 6, wherein reducing the dimension of the channel quality metric vector $(q(H_1, \sigma^2), \ldots, q(H_K, \sigma^2))$ is comprised of computing $$\frac{1}{K} \sum_{k=1}^{K} q(H_k, \sigma^2).$$

10. The method of claim 6, wherein obtaining the BLER is comprised of computing $$BLER \cong p\left(\frac{1}{K} \sum_{k=1}^{K} q(H_k, \sigma^2)\right),$$

where p( ) is a function.

11. An apparatus, comprising:
  a channel gain $H_k$ measurement function block, where k is a sample index from 1 to K, $H_k$ is an m×n matrix of complex channel gain known to a receiver;
  a noise variance $\sigma^2$ measurement function block connected to the channel gain $H_k$ measurement function block;
  a per-sample channel quality metric $q(H_k, \sigma^2)$ function block connected to the noise variance $\sigma^2$ measurement function block and configured to use at least one bound of mutual information;
  a channel quality metric $q(H_k, \sigma^2)$ dimension reduction function block connected to the per-sample channel quality metric $q(H_k, \sigma^2)$ function block; and
  a block error rate (BLER) estimate function block connected to the channel quality metric $q(H_k, \sigma^2)$ dimension reduction function block.

12. The apparatus of claim 11, wherein the at least one bound includes one of a lower bound as follows:

$$I(X;Y) = I(X;\overline{Y}) \geq$$
$$I(X_1;\overline{Y}_1 \mid X_2, \ldots, X_m) + I(X_2;\overline{Y}_2 \mid X_3, \ldots, X_m) + \ldots +$$
$$I(X_{\min\{m,n\}};\overline{Y}_{\min\{m,n\}} \mid X_{\min\{m,n\}+1}, \ldots, X_m) =$$
$$J_1\left(\frac{|r_{11}|^2}{\sigma^2}\right) + \ldots + J_m\left(\frac{|r_{mm}|^2}{\sigma^2}\right),$$

where X is a 1 by m matrix of transmitted modulation symbols with unit power, Y is a 1 by n matrix of n received signals, $J_i$ is a single-layer mutual information for input $X_1$, $Z_k$ is a zero-mean circularly symmetric independent and identically distributed complex Gaussian noise vector with variance $\sigma^2$ for each entry, $\overline{Z}_i$ is statistically equivalent to $Z_i$, min( ) is a function for returning a minimum variable, and $$\begin{bmatrix} \overline{Y}_1 \\ \vdots \\ \overline{Y}_n \end{bmatrix} = \begin{bmatrix} r_{11} & \cdots & 0 \\ 0 & r_{22} & \vdots \\ \vdots & \vdots & \vdots \end{bmatrix} \begin{bmatrix} X_1 \\ \vdots \\ X_m \end{bmatrix} + \begin{bmatrix} \overline{Z}_1 \\ \vdots \\ \overline{Z}_n \end{bmatrix}; \text{ and}$$

$$I(X;Y) \geq \max\left\{ J_1\left(\frac{|r_{11}|^2}{\sigma^2}\right) + \ldots + J_m\left(\frac{|r_{mm}|^2}{\sigma^2}\right), \right.$$
$$\left. J_1\left(\frac{|\tilde{r}_{11}|^2}{\sigma^2}\right) + \ldots + J_m\left(\frac{|\tilde{r}_{mm}|^2}{\sigma^2}\right), \ldots \right\},$$

where $\|h_i\|=\|r_i\|$ indicates a column-wise power identity.

13. The apparatus of claim 11, wherein the at least one bound includes one of an upper bound by orthogonalization and an upper bound by element-wise Gaussian substitution, respectively, as follows:

$$I(X;Y) \leq I(X_1;Y|X_2,\ldots,X_m) + \ldots + I(X_m;Y|X_1,\ldots,X_{m-1}),$$

where X is a 1 by m matrix of transmitted modulation symbols with unit power, and Y is a 1 by n matrix of n received signals; and $$I(X;Y) \leq \min\left\{ J_1\left(h_1^*(H_1 H_1^* + \sigma^2 I)^{-1} h_1\right) + \log_2 \det\left(I + \frac{H_1^* H_1}{\sigma^2}\right), \ldots, \right.$$
$$\left. J_m\left(h_m^*(H_m H_m^* + \sigma^2 I)^{-1} h_m\right) + \log_2 \det\left(I + \frac{H_m^* H_m}{\sigma^2}\right) \right\},$$

where $H_i \equiv [h_1 \ldots h_{i-1} h_{i+} \ldots h_m]$, $J_i$ is a single-layer mutual information for input $X_1$, min( ) is a function for returning a minimum variable, "*" denotes a complex conjugate, $\log_2$ is a logarithm base 2, and det( ) is a determinant function.

14. The apparatus of claim 11, wherein the processor is further configured to reduce the dimension of a channel quality metric vector $(q(H_1, \sigma^2), \ldots, q(H_K, \sigma^2))$ by computing $$\frac{1}{K}\sum_{k=1}^{K} q(H_k, \sigma^2).$$

15. The apparatus of claim 11, wherein the processor is further configured to estimate the BLER by computing $$BLER \cong p\left(\frac{1}{K}\sum_{k=1}^{K} q(H_k, \sigma^2)\right),$$

where p( ) is a function.

16. A method, comprising:
determining, by a channel gain $H_k$ measurement function block, a channel gain $H_k$, based on a received signal, where k is a sample index from 1 to K, $H_k$ is an m×n matrix of complex channel gain known to a receiver;
determining, by a noise variance $\sigma^2$ measurement function block connected to the channel gain $H_k$ measurement function block, a noise variance $\sigma^2$;
estimating, by a per-sample channel quality metric $q(H_k, \sigma^2)$ function block connected to the noise variance $\sigma^2$ measurement function block, a per-sample channel quality metric $q(H_k, \sigma^2)$ using at least one bound of mutual information;
reducing, by a channel quality metric $q(H_k, \sigma^2)$ dimension reduction function block connected to the per-sample channel quality metric $q(H_k, \sigma^2)$ function block, a dimension of the per-sample channel quality metric vector $(q(H_1, \sigma^2), \ldots, q(H_K, \sigma^2))$ by a dimension reduction function g(.); and
obtaining, by a block error rate (BLER) estimate function block connected to the channel quality metric $q(H_k, \sigma^2)$ dimension reduction function block, an estimate of a BLER for a reduced dimension of a channel quality metric $g(q(H_1, \sigma^2), \ldots, q(H_K, \sigma^2))$.

17. The method of claim 16, wherein the at least one bound includes one of a lower bound as follows:

$$I(X;Y) = I(X;\overline{Y}) \geq$$
$$I(X_1;\overline{Y}_1 \mid X_2, \ldots, X_m) + I(X_2;\overline{Y}_2 \mid X_3, \ldots, X_m) + \ldots +$$
$$I(X_{\min\{m,n\}};\overline{Y}_{\min\{m,n\}} \mid X_{\min\{m,n\}+1}, \ldots, X_m) =$$
$$J_1\left(\frac{|r_{11}|^2}{\sigma^2}\right) + \ldots + J_m\left(\frac{|r_{mm}|^2}{\sigma^2}\right),$$

where X is a 1 by m matrix of transmitted modulation symbols with unit power, Y is a 1 by n matrix of n received signals, $J_i$ is a single-layer mutual information for input $X_1$, $Z_k$ is a zero-mean circularly symmetric independent and identically distributed complex Gaussian noise vector with variance $\sigma^2$ for each entry, $\overline{Z}_i$ is statistically equivalent to $Z_i$, min( ) is a function for returning a minimum variable, and $$\begin{bmatrix} \overline{Y}_1 \\ \vdots \\ \overline{Y}_n \end{bmatrix} = \begin{bmatrix} r_{11} & \cdots & 0 \\ 0 & r_{22} & \vdots \\ \vdots & \vdots & \vdots \end{bmatrix} \begin{bmatrix} X_1 \\ \vdots \\ X_m \end{bmatrix} + \begin{bmatrix} \overline{Z}_1 \\ \vdots \\ \overline{Z}_n \end{bmatrix}; \text{ and}$$

$$I(X;Y) \geq \max\left\{ J_1\left(\frac{|r_{11}|^2}{\sigma^2}\right) + \ldots + J_m\left(\frac{|r_{mm}|^2}{\sigma^2}\right), \right.$$
$$\left. J_1\left(\frac{|\tilde{r}_{11}|^2}{\sigma^2}\right) + \ldots + J_m\left(\frac{|\tilde{r}_{mm}|^2}{\sigma^2}\right), \ldots \right\},$$

where $\|h_i\|=\|r_i\|$ indicates a column-wise power identity.

18. The method of claim 16, wherein the at least one bound includes one of an upper bound by orthogonalization and element-wise Gaussian substitution, respectively, as follows:

$$I(X;Y) \leq I(X_1;Y|X_2,\ldots,X_m) + \ldots + I(X_m;Y|X_1,\ldots,X_{m-1}),$$

where X is a 1 by m matrix of transmitted modulation symbols with unit power, and Y is a 1 by n matrix of n received signals; and $$I(X;Y) \leq \min\left\{ J_1\left(h_1^*(H_1 H_1^* + \sigma^2 I)^{-1} h_1\right) + \log_2 \det\left(I + \frac{H_1^* H_1}{\sigma^2}\right), \ldots, J_m\left(h_m^*(H_m H_m^* + \sigma^2 I)^{-1} h_m\right) + \log_2 \det\left(I + \frac{H_m^* H_m}{\sigma^2}\right) \right\},$$

where $H_i \equiv [h_i \ldots h_{i-1} h_{i+1} \ldots h_m]$, $J_i$ is a single-layer mutual information for input $X_1$, min( ) is a function for returning a minimum variable, "*" denotes a complex conjugate, $\log_2$ is a logarithm base 2, and det( ) is a determinant function.

19. The method of claim 16, wherein reducing the dimension of the channel quality metric vector $(q(H_1, \sigma^2), \ldots, q(H_K, \sigma^2))$ is comprised of computing $$\frac{1}{K}\sum_{k=1}^{K} q(H_k, \sigma^2).$$

20. The method of claim 16, wherein obtaining the BLER is comprised of computing $$BLER \cong p\left(\frac{1}{K}\sum_{k=1}^{K} q(H_k, \sigma^2)\right),$$

where p( ) is a function.

* * * * *